United States Patent
Rosenberg et al.

(10) Patent No.: US 10,089,275 B2
(45) Date of Patent: Oct. 2, 2018

(54) COMMUNICATING TRANSACTION-SPECIFIC ATTRIBUTES IN A PERIPHERAL COMPONENT INTERCONNECT EXPRESS (PCIE) SYSTEM

(71) Applicant: QUALCOMM Incorporated, San Diego, CA (US)

(72) Inventors: Ofer Rosenberg, Ramot Menashe (IL); Amit Gil, Zichron Yaakov (IL); James Lionel Panian, San Marcos, CA (US); Piyush Patel, Cary, NC (US); Shaul Yohai Yifrach, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 15/168,574

(22) Filed: May 31, 2016

(65) Prior Publication Data

US 2016/0371221 A1 Dec. 22, 2016

Related U.S. Application Data

(60) Provisional application No. 62/182,807, filed on Jun. 22, 2015.

(51) Int. Cl.
| | |
|---|---|
| *G06F 13/42* | (2006.01) |
| *G06F 13/40* | (2006.01) |
| *G06F 13/16* | (2006.01) |

(52) U.S. Cl.
CPC ...... *G06F 13/4282* (2013.01); *G06F 13/1673* (2013.01); *G06F 13/4022* (2013.01); *G06F 2213/0026* (2013.01)

(58) Field of Classification Search
CPC ............ G03F 13/4282; G06F 13/1673; G06F 13/4002; G06F 2213/0026
(Continued)

(56) References Cited

U.S. PATENT DOCUMENTS

| 8,819,306 B2 | 8/2014 | Ajanovic et al. |
| 2010/0082874 A1 | 4/2010 | Baba et al. |

(Continued)

FOREIGN PATENT DOCUMENTS

EP 2778938 A2 9/2014

OTHER PUBLICATIONS

International Preliminary Report on Patentability for PCT/US2016/035155, dated Jun. 2, 2017, 6 pages.
(Continued)

*Primary Examiner* — Christopher B Shin
(74) *Attorney, Agent, or Firm* — Withrow & Terranova, PLLC (57) ABSTRACT

Communicating transaction-specific attributes in a peripheral component interconnect express (PCIe) system is disclosed. A PCIe system includes a host system and at least one PCIe endpoint. The PCIe endpoint is configured to determine one or more transaction-specific attributes that can improve efficiency and performance of a predefined host transaction. In this regard, in one aspect, the PCIe endpoint encodes the transaction-specific attributes in a transaction layer packet (TLP) prefix of at least one PCIe TLP and provides the PCIe TLP to the host system. In another aspect, a PCIe root complex (RC) in the host system is configured to detect and extract the transaction-specific attributes from the TLP prefix of the PCIe TLP received from the PCIe endpoint. By communicating the transaction-specific attributes in the TLP prefix of the PCIe TLP, it is possible to improve efficiency and performance of the PCIe system without violating the existing PCIe standard.

30 Claims, 7 Drawing Sheets

(58) Field of Classification Search
USPC .......................................................... 710/313
See application file for complete search history.

(56) References Cited

U.S. PATENT DOCUMENTS

| | | | |
|---|---|---|---|
| 2011/0022818 A1* | 1/2011 | Kegel | G06F 12/1081 |
| | | | 711/206 |
| 2013/0259053 A1 | 10/2013 | Sato | |
| 2013/0346655 A1 | 12/2013 | Glaser | |
| 2014/0075235 A1 | 3/2014 | Chandhoke et al. | |
| 2014/0112339 A1 | 4/2014 | Safranek et al. | |
| 2014/0237156 A1 | 8/2014 | Regula et al. | |
| 2014/0269471 A1 | 9/2014 | Wagh et al. | |
| 2014/0281106 A1 | 9/2014 | Saghi et al. | |

OTHER PUBLICATIONS

Author Unknown, "PCI Express® Base Specification Revision 3.0," PCI Express, PCI-SIG, Nov. 10, 2010, 860 pages.
International Search Report and Written Opinion for PCT/US2016/035155, dated Aug. 22, 2016, 13 pages.

* cited by examiner

COMMUNICATING TRANSACTION-SPECIFIC ATTRIBUTES IN A PERIPHERAL COMPONENT INTERCONNECT EXPRESS (PCIE) SYSTEM

PRIORITY CLAIM

The present application claims priority under 35 U.S.C. § 119(e) to U.S. Provisional Patent Application Ser. No. 62/182,807 filed on Jun. 22, 2015 and entitled "ENHANCING PERIPHERAL COMPONENT INTERCONNECT (PCI) EXPRESS (PCIE) ATTRIBUTES TO SUPPORT ADVANCED SYSTEM BUSES," the contents of which is incorporated herein by reference in its entirety.

BACKGROUND

I. Field of the Disclosure

The technology of the disclosure relates generally to Peripheral Component Interconnect express (PCIe).

II. Background

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences. Such increased functionality is enabled by the inclusion of evermore complex integrated circuits (ICs) within the mobile communication devices. As the number and complexity of the ICs within the mobile communication devices has increased, so has the need for the various ICs to communicate with one another.

Several standards have been published outlining various protocols that allow ICs to communicate with one another. A popular protocol is the Peripheral Component Interconnect (PCI) protocol, which comes in various configurations, including the PCI express (PCIe) protocol. While useful as IC to IC communication protocols, PCI and PCIe may also be used to couple a mobile terminal to a remote device through a cable or other connector.

The Advanced Microcontroller Bus Architecture (AMBA) is an open-standard, on-chip interconnect specification for the connection and management of functional blocks in a System on a Chip (SoC). AMBA allows for an Advanced eXtensible Interface (AXI) for high performance, high clock frequency system designs. AXI includes features that make it suitable at a high speed sub-micrometer interconnect, and also allows for attributes to be assigned to transactions to improve performance PCIe does not provide for the use of such attributes. That is, while PCIe has certain inter-transaction attributes, such as priority and ordering attributes, these are attributes of one transaction relative to other transactions and are provided in a header of a PCIe transaction layer packet (TLP). Thus, PCIe could benefit from using performance improving attributes.

SUMMARY OF THE DISCLOSURE

Aspects disclosed in the detailed description include communicating transaction-specific attributes in a peripheral component interconnect express (PCIe) system. A PCIe system includes a host system and at least one PCIe endpoint. The PCIe endpoint is configured to determine one or more transaction-specific attributes (e.g., cacheable, bufferable, read-allocate, and write-allocate) that can improve the efficiency and performance of a predefined host transaction. In this regard, in one aspect, the PCIe endpoint encodes the transaction-specific attributes in a transaction layer packet (TLP) prefix of at least one PCIe TLP and provides the PCIe TLP to the host system. In another aspect, a PCIe root complex (RC) in the host system is configured to detect and extract the transaction-specific attributes from the TLP prefix of the PCIe TLP received from the PCIe endpoint. By communicating the transaction-specific attributes in the TLP prefix of the PCIe TLP, it is possible to improve the efficiency and performance of the PCIe system without violating the existing PCIe standard.

In this regard, in one aspect, a host system is provided. The host system includes a bus interface configured to be coupled to a plurality of PCIe endpoints to receive at least one PCIe TLP that includes a TLP prefix. The host system also includes a PCIe RC including attribute prefix detection and parsing logic. The attribute prefix detection and parsing logic is configured to receive the at least one PCIe TLP from the bus interface. The attribute prefix detection and parsing logic is also configured to detect the TLP prefix in the at least one PCIe TLP. The attribute prefix detection and parsing logic is also configured to parse the TLP prefix to extract one or more transaction-specific attributes associated with a predefined host transaction. The attribute prefix detection and parsing logic is also configured to provide the one or more transaction-specific attributes to an attribute interface.

In another aspect, a method for receiving transaction-specific attributes in a host system is provided. The method includes receiving at least one PCIe TLP that includes a TLP prefix. The method also includes detecting the TLP prefix in the at least one PCIe TLP. The method also includes parsing the TLP prefix to extract one or more transaction-specific attributes associated with a predefined host transaction. The method also includes providing the one or more transaction-specific attributes to an attribute interface.

In another aspect, a PCIe endpoint is provided. The PCIe endpoint includes processing circuitry. The processing circuitry is configured to determine one or more transaction-specific attributes for a predefined host transaction. The processing circuitry is also configured to encode the one or more transaction-specific attributes in a TLP prefix of at least one PCIe TLP. The processing circuitry is also configured to provide the at least one PCIe TLP to a host system communicatively coupled to the PCIe endpoint.

In another aspect, a method for communicating transaction-specific attributes from a PCIe endpoint to a host system is provided. The method includes determining one or more transaction-specific attributes for a predefined host transaction. The method also includes encoding the one or more transaction-specific attributes in a TLP prefix of at least one PCIe TLP. The method also includes providing the at least one PCIe TLP to the host system.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include communicating transaction-specific attributes in a peripheral component interconnect express (PCIe) system. A PCIe system includes a host system and at least one PCIe endpoint. The PCIe endpoint is configured to determine one or more transaction-specific attributes (e.g., cacheable, bufferable, read-allocate, and write-allocate) that can improve the efficiency and performance of a predefined host transaction. In this regard, in one aspect, the PCIe endpoint encodes the transaction-specific attributes in a transaction layer packet (TLP) prefix of at least one PCIe TLP and provides the PCIe TLP to the host system. In another aspect, a PCIe root complex (RC) in the host system is configured to detect and extract the transaction-specific attributes from the TLP prefix of the PCIe TLP received from the PCIe endpoint. By communicating the transaction-specific attributes in the TLP prefix of the PCIe TLP, it is possible to improve the efficiency and performance of the PCIe system without violating the existing PCIe standard.

Figure 1:
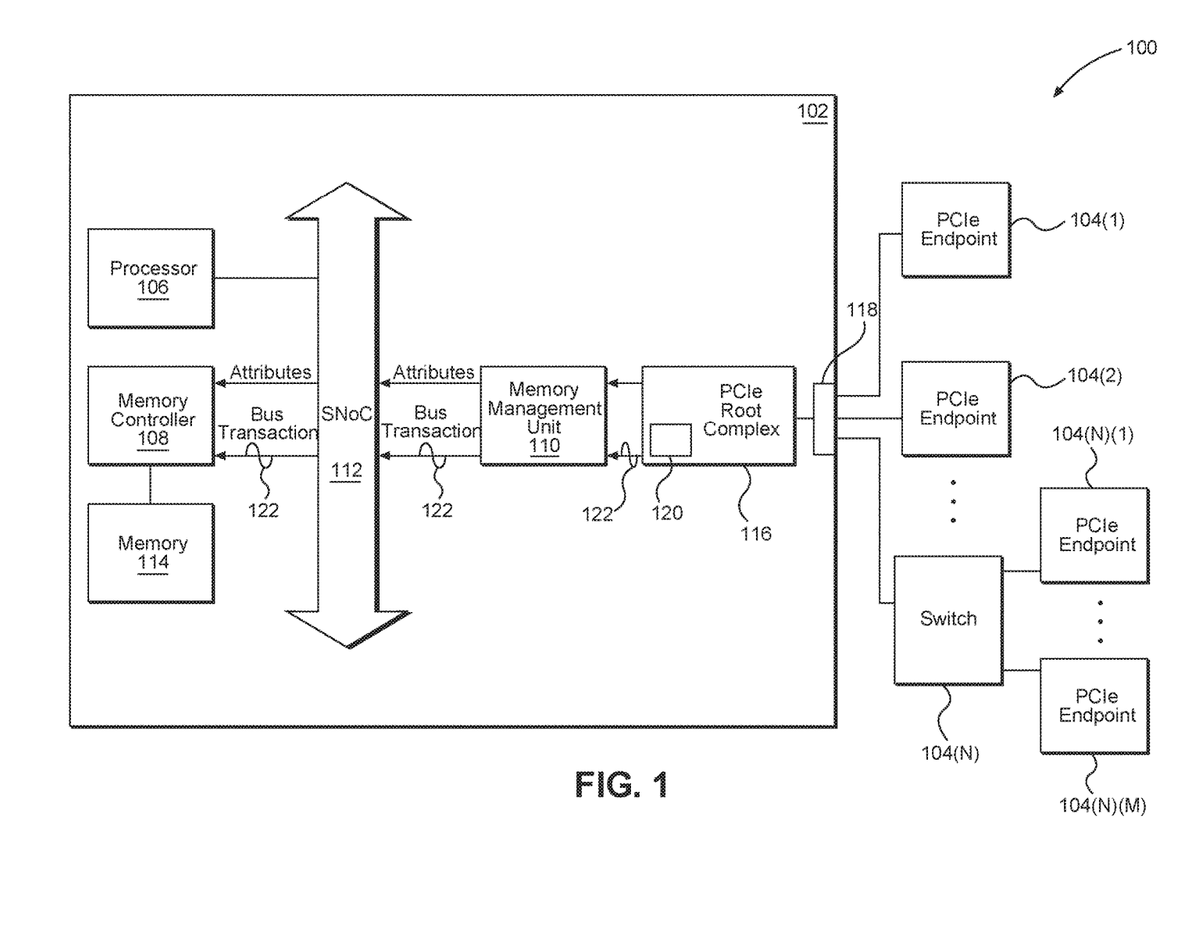
FIG. 1 is a schematic diagram of an exemplary conventional peripheral component interconnect express (PCIe) system.

Before discussing exemplary aspects of communicating transaction-specific attributes in a PCIe system that includes specific aspects of the present disclosure, a brief overview of a conventional PCIe system is first provided in FIG. 1. A brief overview of the PCIe TLP format and performance optimization attributes as defined in the PCIe Base Specification Revision 3.0 (PCIe Specification), published by the peripheral component interconnect (PCI) special interest group (SIG) (PCI-SIG) on Nov. 10, 2010, is then discussed with reference to FIGS. 2A-2C. The discussion of specific exemplary aspects of communicating transaction-specific attributes in a PCIe system starts with reference to FIG. 3.

In this regard, FIG. 1 is a schematic diagram of an exemplary conventional PCIe system 100. The conventional PCIe system 100 includes a host system 102 and a plurality of PCIe endpoints 104(1)-104(N). In a non-limiting example, the PCIe endpoint 104(N) is a PCIe switch 104(N) that controls PCIe endpoints 104(N)(1)-104(N)(M). In this example, the PCIe endpoints 104(N)(1)-104(N)(M) are configured to communicate with the host system 102 via the PCIe switch 104(N).

The host system 102 includes at least one processor 106, a memory controller 108, and a memory management unit (MMU) 110. The processor 106, the memory controller 108, and the MMU 110 are coupled to an internal bus 112 (e.g., a System Network on Chip (SNoC) bus). The memory controller 108 is configured to control a memory 114, such as a dynamic random access memory (DRAM) or a double data rate (DDR) DRAM, for example. The host system 102 also includes a PCIe root complex (RC) 116 communicatively coupled to the MMU 110. The PCIe RC 116 is configured to control the PCIe endpoints 104(1)-104(N) via a bus interface 118. Communication between the PCIe RC 116 and the PCIe endpoints 104(1)-104(N) is based on TLPs (not shown). Each TLP includes address information enabling the PCIe RC 116 to route the TLP correctly to the PCIe endpoints 104(1)-104(N). In this regard, the PCIe RC 116 is analogous to a router of an internet-protocol (IP) network, and the TLPs are analogous to IP packets communicated in the IP network.

According to the PCIe Specification, TLPs are used to communicate transactions, such as read and write, as well as certain types of events, between the PCIe RC 116 and the PCIe endpoints 104(1)-104(N). The PCIe Specification defines four (4) types of transactions, including memory transaction, input/output (I/O) transaction, configuration transaction, and message transaction. The memory transaction includes Read Request, Write Request, and AtomicOp request transactions. Such transactions may be accompanied with inter-transaction attributes, such as priority, ordering, and snoopable attributes, that define how the host system 102 treats one PCIe transaction relative to another PCIe transaction. The inter-transaction attributes may be provided in the TLPs according to the PCIe Specification. To help understand how the TLPs can be configured to communicate the inter-transaction attributes according to the PCIe Specification, FIGS. 2A-2C are discussed next.

Figure 2A:
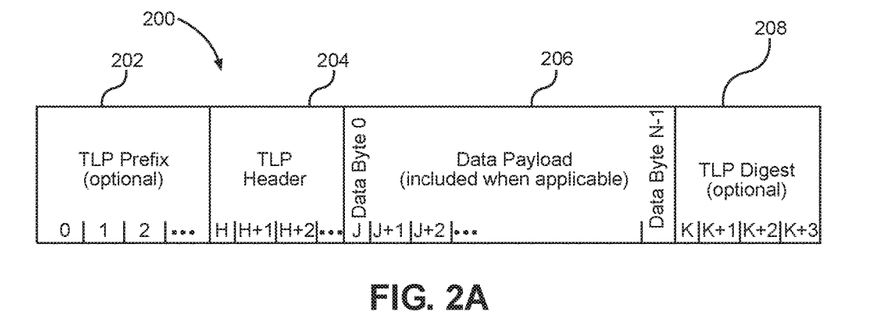
FIG. 2A is a schematic diagram of an exemplary PCIe transaction layer packet (TLP) as defined in the PCIe Base Specification Revision 3.0 (PCIe Specification)

In this regard, FIG. 2A is a schematic diagram of an exemplary PCIe TLP 200 as defined in the PCIe Specification. The PCIe TLP 200 includes a TLP prefix 202, a TLP header 204, a data payload 206, and a TLP digest 208. The TLP prefix 202 and the TLP digest 208 are optional according to the PCIe Specification. In a non-limiting example, the TLP prefix 202 is encoded according to a vendor-defined data structure to carry vendor-specific information. According to the PCIe Specification, the inter-transaction attributes are communicated in the TLP header 204.

Figure 2B:
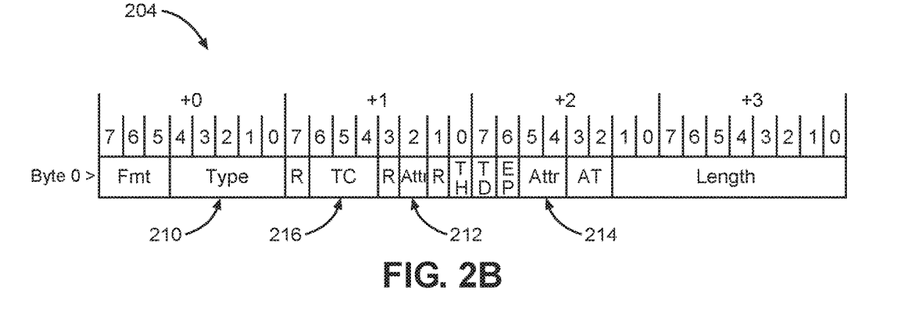
FIG. 2B is a schematic diagram of a TLP header in the PCIe TLP of FIG. 2A as defined in the PCIe Specification.
Figure 2C:
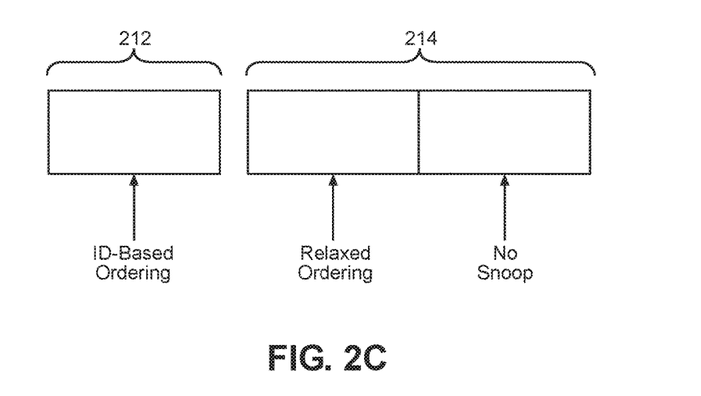
FIG. 2C is a schematic diagram providing exemplary illustrations of a first attribute field and a second attribute field in the TLP header of FIG. 2B for communicating inter-transaction attributes.

In this regard, FIG. 2B is a schematic diagram of the TLP header 204 in the PCIe TLP 200 of FIG. 2A as defined in the PCIe Specification. The TLP header 204 includes a type field 210. The type field 210 may be encoded to indicate types of transactions, such as memory read request, memory write request, I/O read request, and I/O write request, for example. The TLP header 204 also includes a first attribute field 212 (abbreviated as Attr in FIG. 2B), a second attribute field 214 (abbreviated as Attr in FIG. 2B), and a traffic class field 216 (abbreviated as TC in FIG. 2B). The first attribute field 212, the second attribute field 214, and the traffic class field 216 are part of a PCIe transaction descriptor (not shown) that carries transaction information between the PCIe RC 116 and the PCIe endpoints 104(1)-104(N) of FIG. 1.

According to the PCIe Specification, the first attribute field 212 and the second attribute field 214 are configured to communicate inter-transaction attributes. In this regard, FIG. 2C is a schematic diagram providing exemplary illustrations of the first attribute field 212 and the second attribute field 214 in the TLP header 204 of FIG. 2B for communicating the inter-transaction attributes. According to the PCIe Specification, the first attribute field 212 has a respective length of one (1) binary bit (1-bit) and is configured to identify identification (ID)-based ordering attributes. The second attribute field 214 has a respective length of two (2) binary bits (2-bit) and is configured to identify relaxed ordering and no snoop attributes. Attributes (e.g., the ID-based ordering attribute, the relaxed ordering attribute, and the no snoop attribute) that are carried in the first attribute field 212 and the second attribute field 214 are hereinafter referred to as standard attributes.

With reference back to FIG. 1, the host system 102 includes a transaction parsing logic 120 configured to parse the data payload 206 in the PCIe TLP 200 of FIG. 2A. The transaction parsing logic 120 is also configured to parse the first attribute field 212 and the second attribute field 214 in the TLP header 204 of FIG. 2B. The transaction parsing logic 120 passes the attributes received in the first attribute field 212 and the second attribute field 214 to the MMU 110. The transaction parsing logic 120 also generates a bus transaction 122 and provides the bus transaction 122 to the MMU 110. The MMU 110 is configured to provide the bus transaction 122 to the memory controller 108 via the internal bus 112.

As previously discussed, the inter-transaction attributes, such as priority, ordering, and snoopable attributes, define how the host system 102 treats one PCIe transaction relative to another PCIe transaction. As defined in the PCIe Specification, the memory transaction includes the Read Request, the Write Request, and the AtomicOp request transactions. In this regard, the inter-transaction attributes define the priority and/or ordering between the Read Request, the Write Request, and the AtomicOp request transactions. However, in some host system architectural designs, for example a microprocessor architecture developed by British company ARM Holdings, it is possible to include intra-transaction attributes to improve efficiency and performance of the host system 102.

In a non-limiting example, the intra-transaction attributes include a cacheable attribute, a bufferable attribute, a read-allocate attribute, a write-allocate attribute, an instruction/data attribute, a privileged/user attribute, a write-through attribute, an ordered write & ordered read attribute. The cacheable attribute defines whether data at a destination entity (e.g., the PCIe endpoint 104(1)) needs to match an original format at an originating entity (e.g., the processor 106). If a memory transaction is defined as being cacheable in the cacheable attribute, then the data at the destination entity does not need to match the original format at the originating entity. In this regard, the host system 102 may mix the data of the cacheable transaction with data of other transactions in a TLP. The bufferable attribute defines whether data can be buffered (delayed) when arriving at the destination entity. The read-allocate attribute defines whether data associated with a read transaction must be allocated in a cache (not shown) if the read transaction has a miss in the cache. The write-allocate attribute defines whether data associated with a write transaction must be allocated in a cache if the write transaction has a miss in the cache. The instruction/data attribute indicates whether data is a bus transaction instruction or a transaction data. The MMU 110 and/or the memory controller 108 can determine to execute the bus transaction instruction instead of checking read/write permission based on the instruction/data attribute. The privileged/user attribute indicates whether the bus transaction 122 is a user mode or a privileged mode access. The MMU 110 and/or the memory controller 108 can use the privileged/user attribute to determine memory access permission. The write-through attribute indicates whether a cache (not shown) should handle the bus transaction 122 as a write-through or a write-back. The write-through attribute may be used by a variety of caches (e.g., system cache, level 2 (L2) cache, etc.) in the host system 102. The ordered write & ordered read attribute indicates that concurrent bus transactions (write or read) need to be ordered. The ordered write & ordered read attribute is used by the internal bus 112 to order the bus transaction 122 against all previous bus transactions. In this regard, the intra-transaction attributes define transaction-handling preferences for specific transactions. For example, the read-allocate attribute may pertain to the Read Request transaction, and the write-allocate attribute may pertain to the Write Request transaction. As such, the intra-transaction attributes discussed above are hereinafter referred to as transaction-specific attributes.

The transaction-specific attributes as discussed above can help improve efficiency and performance of the host system 102. However, when the memory transactions originate from the PCIe endpoints 104(1)-104(N), the host system 102 has limited knowledge regarding the nature of the transactions (e.g., Read Request, Write Request, AtomicOp Request) and, thus, cannot determine the transaction-specific attributes for the PCIe endpoints 104(1)-104(N). In contrast, the PCIe endpoints 104(1)-104(N) are aware of the transaction-specific attributes, but are unable to pass the transaction-specific attributes to the host system 102, because the PCIe Specification does not provide a mechanism for communicating the transaction-specific attributes. As such, it may be desirable to enable the PCIe endpoints 104(1)-104(N) to communicate the transaction-specific attributes to the PCIe RC 116 while maintaining compliance with the PCIe Specification.

Figure 3:
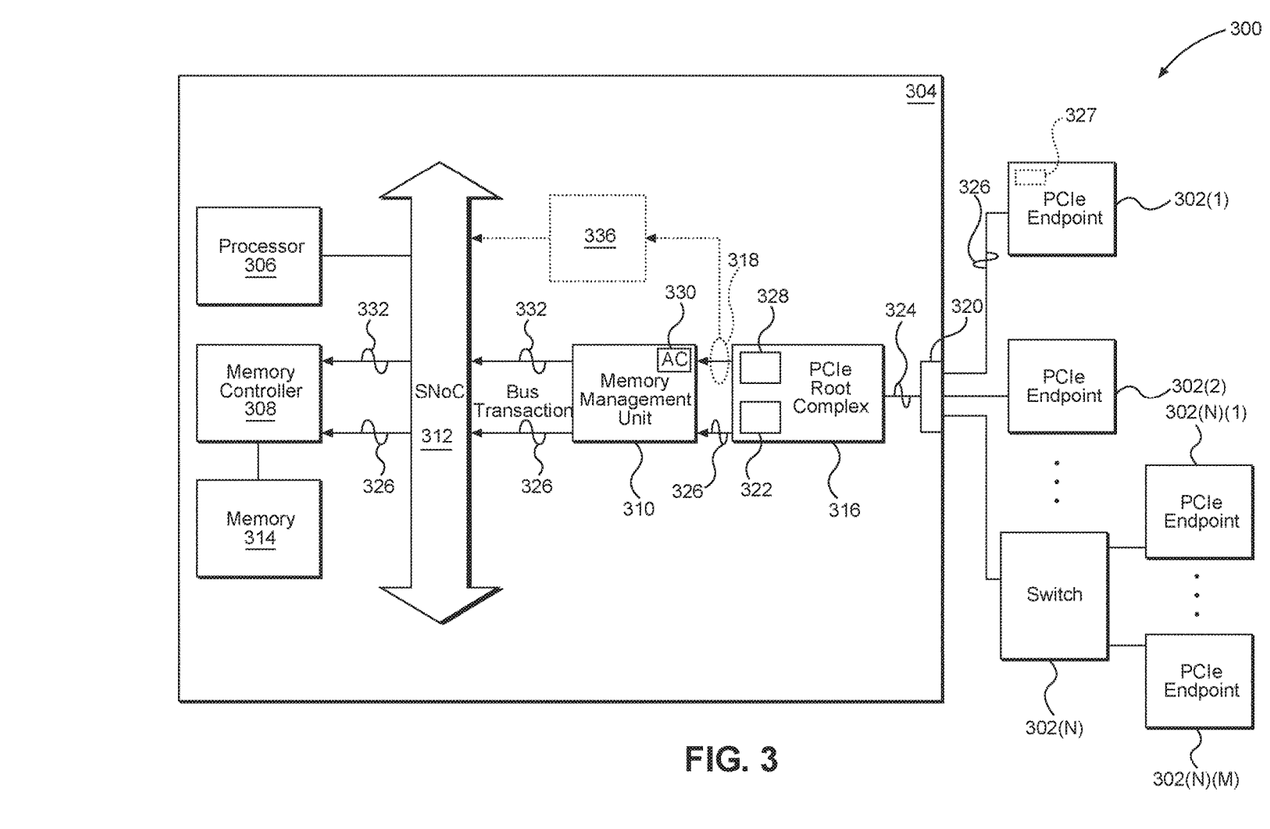
FIG. 3 is a schematic diagram of an exemplary PCIe system configured to enable a plurality of PCIe endpoints to communicate transaction-specific attributes to a host system for efficiency and performance improvement in the PCIe system.

In this regard, FIG. 3 is a schematic diagram of an exemplary PCIe system 300 configured to enable a plurality of PCIe endpoints 302(1)-302(N) to communicate the transaction-specific attributes to a host system 304 for efficiency and performance improvement in the PCIe system 300. In a non-limiting example, the PCIe endpoint 302(N) is a PCIe switch 302(N) that controls PCIe endpoints 302(N)(1)-302(N)(M). In this example, the PCIe endpoints 302(N)(1)-302(N)(M) are configured to communicate with the host system 304 via the PCIe switch 302(N).

For the convenience of reference, the PCIe endpoint 302(1) is discussed hereinafter as a non-limiting example. It shall be appreciated that the configurations and operations discussed with reference to the PCIe endpoint 302(1) are applicable to each of the PCIe endpoints 302(1)-302(N) and the PCIe endpoints 302(N)(1)-302(N)(M).

With reference to FIG. 3, the host system 304 includes at least one processor 306, a memory controller 308, and an MMU 310. The processor 306, the memory controller 308, and the MMU 310 are coupled to an internal bus 312 (e.g., a SNoC bus). The memory controller 308 is configured to control a memory 314, such as a DRAM or a DDR DRAM, for example. The host system 304 also includes a PCIe RC 316 communicatively coupled to the MMU 310 via an attribute interface 318. In a non-limiting example, the attribute interface 318 is a physical interface or a logical interface. The PCIe RC 316 is configured to control the PCIe endpoints 302(1)-302(N) via a bus interface 320. Communication between the PCIe RC 316 and the PCIe endpoints 302(1)-302(N) is based on TLPs, as discussed in reference to FIG. 2A. The host system 304 includes a transaction parsing logic 322 configured to parse the data payload 206 in the PCIe TLP 200 of FIG. 2A. The transaction parsing logic 322 is also configured to parse the first attribute field 212 and the second attribute field 214 in the TLP header 204 of FIG. 2B.

As previously discussed in FIG. 2A, the PCIe TLP 200 optionally includes the TLP prefix 202 that may be encoded according to a vendor-defined data structure to carry vendor-specific information. According to exemplary aspects of previous discussions, the PCIe endpoint 302(1) is configured to communicate the transaction-specific attributes to the PCIe RC 316 by embedding a vendor-defined data structure in the TLP prefix 202 in the PCIe TLP 200.

Figure 4:
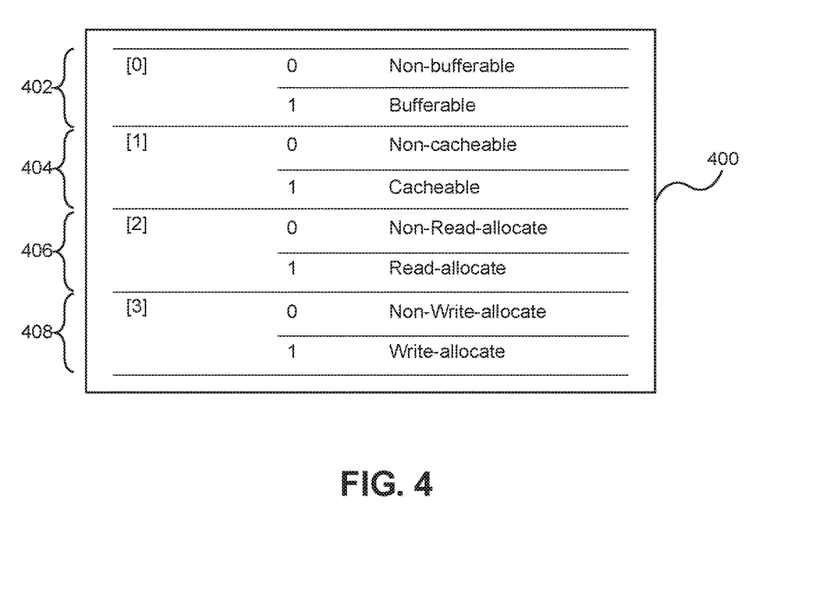
FIG. 4 is a schematic diagram of an exemplary data structure that each of the PCIe endpoints of FIG. 3 can use to encode the transaction-specific attributes of FIG. 3 in a TLP prefix of the PCIe TLP of FIG. 2A for communication to the host system of FIG. 3.

In this regard, FIG. 4 is a schematic diagram of an exemplary data structure 400 that each of the PCIe endpoints 302(1)-302(N) can use to encode the transaction-specific attributes of FIG. 3 in the TLP prefix 202 of the PCIe TLP 200 of FIG. 2A for communication to the host system 304 of FIG. 3. In a non-limiting example, the data structure 400 includes a bufferable attribute bit 402, a cacheable attribute bit 404, a read-allocate attribute bit 406, and a write-allocate attribute bit 408. It shall be appreciated that the data structure 400 can be expanded to include more attribute bits therein.

With reference to FIG. 4, the bufferable attribute bit 402 is set to zero (0) or one (1) to indicate that a transaction originating from the PCIe endpoint 302(1) is non-bufferable or bufferable, respectively. The cacheable attribute bit 404 is set to 0 or 1 to indicate that the transaction originating from the PCIe endpoint 302(1) is non-cacheable or cacheable, respectively. The read-allocate attribute bit 406 is set to 0 or 1 to indicate that the transaction originating from the PCIe endpoint 302(1) is non-read-allocate or read-allocate, respectively. The write-allocate attribute bit 408 is set to 0 or 1 to indicate that the transaction originating from the PCIe endpoint 302(1) is non-write-allocate or write-allocate, respectively.

With reference back to FIG. 3, the PCIe endpoint 302(1) includes processing circuitry 327 configured to determine one or more transaction-specific attributes for a predefined host transaction, which may be the Read Request, the Write Request, or the AtomicOp Request, for example. The PCIe endpoint 302(1) is configured to encode the transaction-specific attributes associated with the predefined host transaction in the TLP prefix 202 of at least one PCIe TLP 324. The PCIe endpoint 302(1) then provides the PCIe TLP 324 to the bus interface 320 for communication to the host system 304.

The PCIe RC 316 receives the PCIe TLP 324 via the bus interface 320. The transaction parsing logic 322 parses the data payload 206 (and any of the standard attributes) in the PCIe TLP 324. The transaction parsing logic 322 generates a bus transaction 326 for the predefined host transaction and provides the bus transaction 326 to the MMU 310. The MMU 310 is configured to provide the bus transaction 326 to the memory controller 308 via the internal bus 312.

The PCIe RC 316 includes attribute prefix detection and parsing logic 328. The attribute prefix detection and parsing logic 328 is configured to receive the PCIe TLP 324 from the bus interface 320 and detect the TLP prefix 202 in the received PCIe TLP 324. Substantially concurrent to the transaction parsing logic 322 parsing the data payload 206 (and any of the standard attributes) in the PCIe TLP 324, the attribute prefix detection and parsing logic 328 parses the TLP prefix 202 to extract the transaction-specific attributes encoded in the data structure 400 of FIG. 4 by the PCIe endpoint 302(1). The attribute prefix detection and parsing logic 328 then provides the transaction-specific attributes to the attribute interface 318.

The MMU 310 includes an attribute converter 330 (abbreviated as AC in FIG. 3) configured to receive the transaction-specific attributes from the attribute interface 318. The attribute converter 330 converts the transaction-specific attributes into one or more bus-specific attributes 332 and provides the bus-specific attributes 332 to the memory controller 308. In a first non-limiting example, the bus-specific attributes 332 are communicated as an in-band signal of the bus transaction 326. As a result, the bus-specific attributes 332 are synchronous with the bus transaction 326. In a second non-limiting example, the bus-specific attributes 332 are communicated as a side-band signal to the bus transaction 326. As a result, the bus-specific attributes 332 need to be synchronized with the bus transaction 326 by the host system 304. The memory controller 308 may then use transaction-specific attributes to improve performance of the host system 304. In a non-limiting example, the attribute converter 330 is configured to convert the transaction-specific attributes into one or more Advanced eXtensible Interface (AXI)-specific attributes, and provide the AXI-specific attributes to the memory controller 308 via the internal bus 312.

As previously discussed in FIG. 4, the data structure 400 may be expanded to include more attribute bits. As such, the attribute prefix detection and parsing logic 328 may be configured to receive and parse other transaction-specific attributes (e.g., non-memory transaction attributes) and provide the other transaction-specific attributes to the attribute interface 318. Accordingly, circuitry 336, which is functionally different from the MMU 310, may be configured to receive the other transaction-specific attributes via the attribute interface 318 to perform other predefined host transactions in the host system 304. In a non-limiting example, the circuitry 336 receives attributes that are not required to go through the MMU 310. Such attributes are not dependent on address translation and/or other memory page attributes. The circuitry 336 can inject the received attributes (e.g., the ordered write & ordered read attribute) directly to the internal bus 312.

The host system 304 may be configured to receive the transaction-specific attributes from the PCIe endpoint 302(1) according to a host-side process. In this regard, FIG. 5 is a flowchart of an exemplary host process 500 for receiving the transaction-specific attributes in the host system 304 of FIG. 3.

Figure 5:
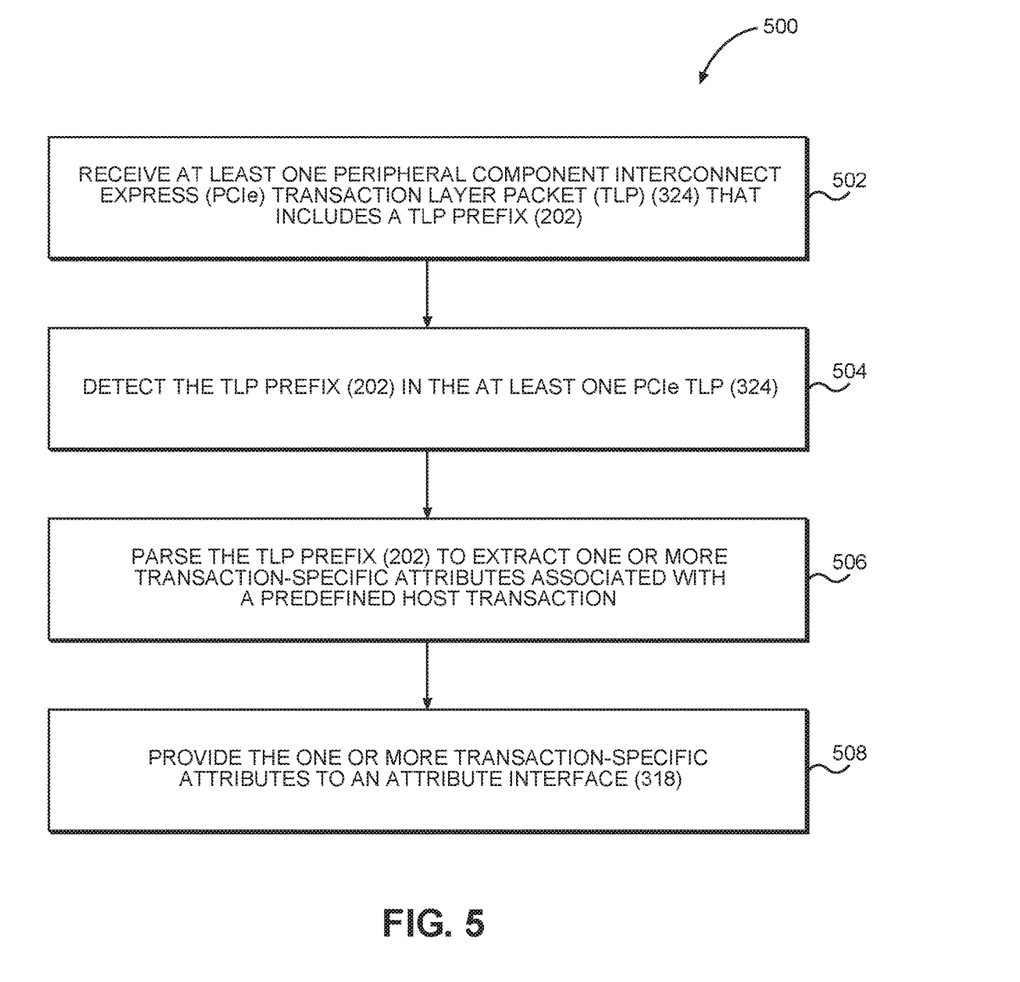
FIG. 5 is a flowchart of an exemplary host process for receiving the transaction-specific attributes in the host system of FIG. 3.

With reference to FIG. 5, the attribute prefix detection and parsing logic 328 receives the PCIe TLP 324 that includes the TLP prefix 202 of FIG. 2B (block 502). The attribute prefix detection and parsing logic 328 detects the TLP prefix 202 in the PCIe TLP 324 (block 504). The attribute prefix detection and parsing logic 328 parses the TLP prefix 202 to extract the transaction-specific attributes associated with a predefined host transaction (block 506). The attribute prefix detection and parsing logic 328 then provides the transaction-specific attributes to the attribute interface 318 (block 508).

With reference back to FIG. 3, the PCIe endpoint 302(1) may be configured to provide the transaction-specific attributes to the host system 304 according to a PCIe endpoint-side process. In this regard, FIG. 6 is a flowchart of an exemplary PCIe endpoint process 600 for communicating the transaction-specific attributes to the host system 304 of FIG. 3.

Figure 6:
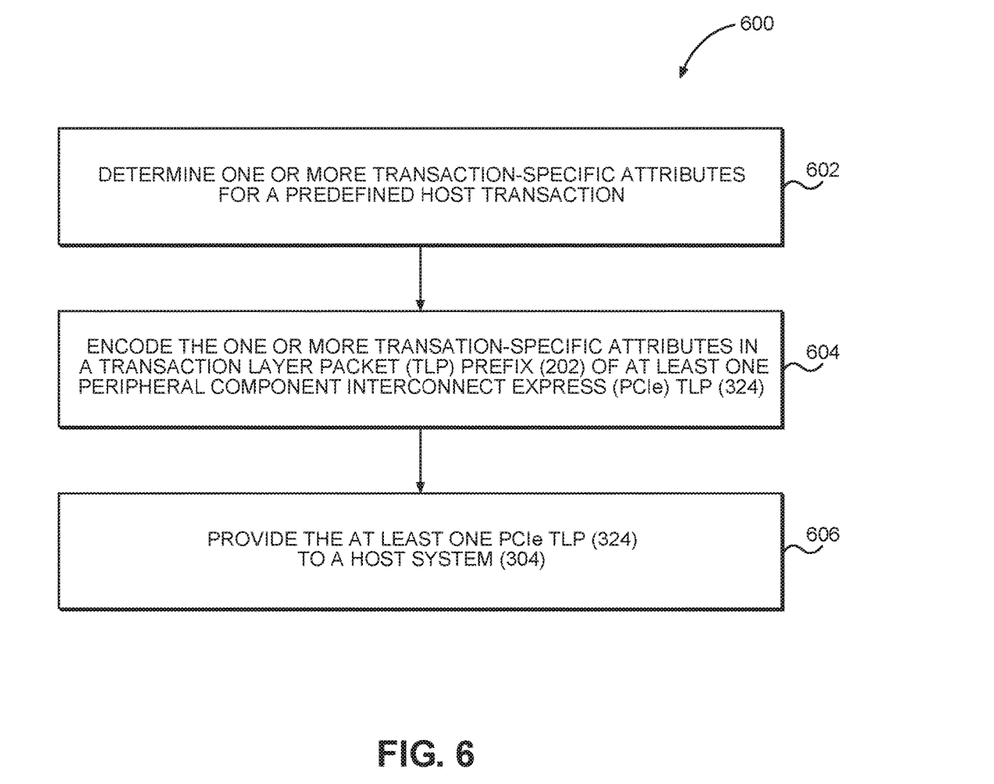
FIG. 6 is a flowchart of an exemplary PCIe endpoint process for communicating the transaction-specific attributes to the host system of FIG. 3.

With reference to FIG. 6, the PCIe endpoint 302(1) determines the transaction-specific attributes for a pre-defined host transaction (block 602). The PCIe endpoint 302(1) then encodes the transaction-specific attributes in the TLP prefix 202 of FIG. 2A of the PCIe TLP 324 (block 604). The PCIe endpoint 302(1) then provides the PCIe TLP 324 to the host system 304 (block 606).

With reference back to FIG. 3, the PCIe RC 316 in the host system 304 is configured to enable backward compatibility with the PCIe Specification. In this regard, if the attribute prefix detection and parsing logic 328 detects that the TLP prefix 202 in the PCIe TLP 324 does not contain the data structure 400 of FIG. 4, the attribute prefix detection and parsing logic 328 will not parse the TLP prefix 202 to extract the transaction-specific attributes encoded. As a result, the attribute prefix detection and parsing logic 328 will not provide the transaction-specific attributes to the attribute interface 318, and the attribute converter 330 in the MMU 310 will not convert the transaction-specific attributes into the bus-specific attributes 332.

The PCIe endpoint 302(1) is also configured to enable backward compatibility with the PCIe Specification. In this regard, it may be possible to provide capability messaging between the PCIe RC 316 and the PCIe endpoint 302(1). Specifically, the PCIe Specification allows for definition of a new capability structure with a unique capability identifier. When the PCIe endpoint 302(1) is detected by the PCIe RC 316, the PCIe RC 316 sends a capability inquiry (not shown) as part of the initial setup if the PCIe RC 316 supports the data structure 400. If the PCIe endpoint 302(1) supports the data structure 400, the PCIe endpoint 302(1) responds with the unique capability identifier. If the PCIe endpoint 302(1) does not support the data structure 400, the PCIe endpoint 302(1) will ignore the capability inquiry from the PCIe RC 316. If the PCIe endpoint 302(1) does not receive the capability inquiry from the PCIe RC 316 during the initial setup, the PCIe endpoint 302(1) may conclude that the PCIe RC 316 does not support the data structure 400 (e.g., a legacy PCIe RC). Therefore, the PCIe endpoint 302(1) may refrain from adding the data structure 400 into the TLP prefix 202 in the PCIe TLP 324. The PCIe endpoint 302(1) may use an internal register (not shown) to indicate whether the PCIe RC 316 supports the data structure 400 based on the outcome of the initial setup.

The host system 304 of FIG. 3 according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile. While all such devices may benefit from the present disclosure, devices relying on a wireless connection and having an RFFE bus will see the greatest benefit from using aspects of the present disclosure.

Figure 7:
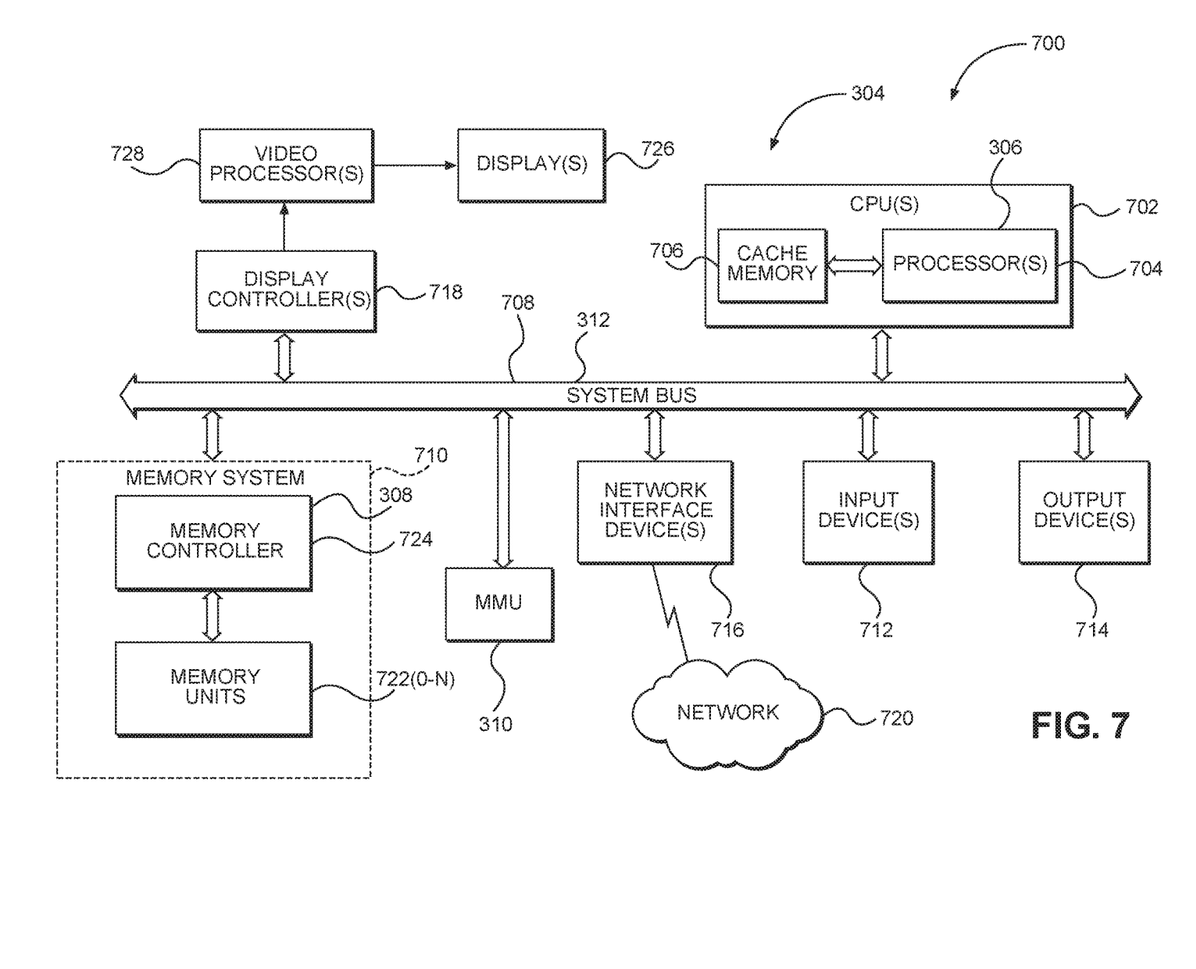
FIG. 7 is a block diagram of an exemplary processor-based system that can include the PCIe system of FIG. 3.

In this regard, FIG. 7 illustrates an example of a processor-based system 700 that can support the host system 304 of FIG. 3. In this example, the processor-based system 700 includes one or more central processing units (CPUs) 702, each including one or more processors 704 (e.g., the processor 306 of FIG. 3). The CPU(s) 702 may have cache memory 706 coupled to the processor(s) 704 for rapid access to temporarily stored data. The CPU(s) 702 is coupled to a system bus 708, which can be the internal bus 312 of FIG. 3. As is well known, the CPU(s) 702 communicates with other devices by exchanging address, control, and data information over the system bus 708. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 710, one or more input devices 712, one or more output devices 714, one or more network interface devices 716, one or more display controllers 718, and the MMU 310 of FIG. 3, as examples. The input device(s) 712 can include any type of input device, including, but not limited to, input keys, switches, voice processors, etc. The output device(s) 714 can include any type of output device, including, but not limited to, audio, video, other visual indicators, etc. The network interface device(s) 716 can be any device configured to allow exchange of data to and from a network 720. The network 720 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 716 can be configured to support any type of communications protocol desired. The memory system 710 can include one or more memory units 722(0-N) and a memory controller 724, which may be the memory controller 308 of FIG. 3.

The CPU(s) 702 may also be configured to access the display controller(s) 718 over the system bus 708 to control information sent to one or more displays 726. The display controller(s) 718 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A host system, comprising:
   a bus interface configured to be coupled to a plurality of peripheral component interconnect express (PCIe) endpoints to receive at least one PCIe transaction layer packet (TLP) that comprises a TLP prefix; and
   a PCIe root complex (RC) comprising attribute prefix detection and parsing logic configured to:
      receive the at least one PCIe TLP from the bus interface;
      detect the TLP prefix in the at least one PCIe TLP;
      parse the TLP prefix to extract one or more transaction-specific attributes associated with a predefined host transaction; and
      provide the one or more transaction-specific attributes to an attribute interface.

2. The host system of claim 1, wherein the predefined host transaction is a memory transaction selected from the group consisting of: a Read Request; a Write Request; and an AtomicOp request.

3. The host system of claim 1, further comprising:
   a memory controller coupled to an internal bus, the memory controller configured to control a memory; and
   a memory management unit (MMU) communicatively coupled to the internal bus, the MMU comprising an attribute converter configured to:
      receive the one or more transaction-specific attributes from the attribute interface;
      convert the one or more transaction-specific attributes into one or more bus-specific attributes; and
      provide the one or more bus-specific attributes to the memory controller.

4. The host system of claim 3, wherein the attribute converter is further configured to:
   convert the one or more transaction-specific attributes into one or more Advanced eXtensible Interface (AXI)-specific attributes; and
   provide the one or more AXI-specific attributes to the memory controller.

5. The host system of claim 1, wherein the one or more transaction-specific attributes comprises a cacheable attribute.

6. The host system of claim 1, wherein the one or more transaction-specific attributes comprise a bufferable attribute.

7. The host system of claim 1, wherein the one or more transaction-specific attributes comprise a read-allocate attribute.

8. The host system of claim 1, wherein the one or more transaction-specific attributes comprise a write-allocate attribute.

9. The host system of claim 1, wherein the one or more transaction-specific attributes include a transaction-specific attribute selected from the group consisting of: an instruction/data attribute; a privileged/user attribute; a write-through attribute; and an ordered write & ordered read attribute.

10. The host system of claim 1, wherein the PCIe RC further comprises transaction parsing logic configured to parse payload and standard attributes in the at least one PCIe TLP.

11. The host system of claim 1 integrated into an integrated circuit (IC).

12. The host system of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

13. A method for receiving transaction-specific attributes in a host system, comprising:
receiving at least one peripheral component interconnect express (PCIe) transaction layer packet (TLP) that comprises a TLP prefix;
detecting the TLP prefix in the at least one PCIe TLP;
parsing the TLP prefix to extract one or more transaction-specific attributes associated with a predefined host transaction; and
providing the one or more transaction-specific attributes to an attribute interface.

14. The method of claim 13, further comprising:
receiving the one or more transaction-specific attributes from the attribute interface;
converting the one or more transaction-specific attributes into one or more bus-specific attributes; and
providing the one or more bus-specific attributes to a memory controller.

15. The method of claim 14, further comprising:
converting the one or more transaction-specific attributes into one or more Advanced eXtensible Interface (AXI)-specific attributes; and
providing the one or more AXI-specific attributes to the memory controller.

16. The method of claim 13, further comprising receiving a cacheable attribute in the TLP prefix of the at least one PCIe TLP.

17. The method of claim 13, further comprising receiving a bufferable attribute in the TLP prefix of the at least one PCIe TLP.

18. The method of claim 13, further comprising receiving a read-allocate attribute in the TLP prefix of the at least one PCIe TLP.

19. The method of claim 13, further comprising receiving a write-allocate attribute in the TLP prefix of the at least one PCIe TLP.

20. A peripheral component interconnect express (PCIe) endpoint, comprising processing circuitry configured to:
determine one or more transaction-specific attributes for a predefined host transaction;
encode the one or more transaction-specific attributes in a transaction layer packet (TLP) prefix of at least one PCIe TLP; and
provide the at least one PCIe TLP to a host system communicatively coupled to the PCIe endpoint.

21. The PCIe endpoint of claim 20, wherein the predefined host transaction is a memory transaction selected from the group consisting of: a Read Request; a Write Request; and an AtomicOp request.

22. The PCIe endpoint of claim 20, wherein the one or more transaction-specific attributes comprise a cacheable attribute.

23. The PCIe endpoint of claim 20, wherein the one or more transaction-specific attributes comprise a bufferable attribute.

24. The PCIe endpoint of claim 20, wherein the one or more transaction-specific attributes comprise a read-allocate attribute.

25. The PCIe endpoint of claim 20, wherein the one or more transaction-specific attributes comprise a write-allocate attribute.

26. A method for communicating transaction-specific attributes from a peripheral component interconnect express (PCIe) endpoint to a host system, comprising:
determining one or more transaction-specific attributes for a predefined host transaction;
encoding the one or more transaction-specific attributes in a transaction layer packet (TLP) prefix of at least one PCIe TLP; and
providing the at least one PCIe TLP to the host system.

27. The method of claim 26, further comprising providing a cacheable attribute in the TLP prefix of the at least one PCIe TLP.

28. The method of claim 26, further comprising providing a bufferable attribute in the TLP prefix of the at least one PCIe TLP.

29. The method of claim 26, further comprising providing a read-allocate attribute in the TLP prefix of the at least one PCIe TLP.

30. The method of claim 26, further comprising providing a write-allocate attribute in the TLP prefix of the at least one PCIe TLP.

* * * * *